US011120682B2

(12) United States Patent
Munir et al.

(10) Patent No.: US 11,120,682 B2
(45) Date of Patent: Sep. 14, 2021

(54) SYSTEM AND METHOD FOR OPERATING PHYSICAL ENTITIES BASED ON A VIRTUAL REPRESENTATION OF THE PHYSICAL ENTITIES

(71) Applicant: Robert Bosch GmbH, Stuttgart (DE)

(72) Inventors: Sirajum Munir, Pittsburgh, PA (US); Samarjit Das, Sewickley, PA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/280,583

(22) Filed: Feb. 20, 2019

(65) Prior Publication Data
US 2020/0265708 A1   Aug. 20, 2020

(51) Int. Cl.
*G06F 21/34* (2013.01)
*G06F 21/35* (2013.01)
(Continued)

(52) U.S. Cl.
CPC ........... *G08C 17/02* (2013.01); *G06F 1/1694* (2013.01); *G06F 3/011* (2013.01); *G06F 16/21* (2019.01);
(Continued)

(58) Field of Classification Search
CPC .... G06F 1/1626; G06F 1/1671; G06F 1/1684; G06F 1/169; G06F 1/1694; G06F 1/1698; G06F 1/266; G06F 1/3203; G06F 2203/0338; G06F 2203/0339; G06F 3/04847; G06F 3/04883; G06F 3/04886; G06F 9/451; G06F 9/452; G06F 21/34; G06F 21/35; G06F 2203/04806; G06F 2203/04808; G06F 3/011; G06F 3/04815; G06F 3/0482; G06F 3/04845; G06F 3/0484; G06F 3/0487; G06K 19/0717; G06K 7/10168; G06K 7/10405; G06K 9/6253; G08C 17/02; G08C 2201/40; G08C 2201/93; H04M 1/72533; H04M 1/72563; H04M 2250/12; H04M 2250/22; H04M 1/72415; H04M 1/72448; H04N 21/4126;
(Continued)

(56) References Cited

U.S. PATENT DOCUMENTS 9,646,489 B2 * 5/2017 Cho ........................ H05B 45/10
2014/0070707 A1   3/2014 Nagazoe
(Continued)

FOREIGN PATENT DOCUMENTS

| EP | 2 945 407 A1 | 11/2015 |
| KR | 10-2018-0010751 A | 1/2018 |
| WO | 2011/019155 A2 | 2/2011 |

*Primary Examiner* — Dionne Pendleton
(74) *Attorney, Agent, or Firm* — Maginot, Moore & Beck LLP (57) ABSTRACT

A method of operating a selected electronic device of a plurality of electronic devices includes generating image data of at least the selected electronic device with an imaging device, displaying a virtual representation of at least the selected electronic device on a display device based on the generated image data, and receiving a user input with an input device. The method further includes associating the user input with the selected electronic device using a controller, transmitting device data to the selected electronic device with a transceiver, and performing an operation with the selected electronic device based on the transmitted device data.

16 Claims, 4 Drawing Sheets

(51) Int. Cl.
| | |
|---|---|
| H04L 29/08 | (2006.01) |
| H04L 29/06 | (2006.01) |
| G08C 17/02 | (2006.01) |
| G06F 16/21 | (2019.01) |
| G06K 9/62 | (2006.01) |
| G06Q 30/02 | (2012.01) |
| G06F 3/01 | (2006.01) |
| G06F 1/16 | (2006.01) |
| H04W 12/63 | (2021.01) |
| G06T 15/00 | (2011.01) |
| H04W 12/68 | (2021.01) |
| G06T 19/00 | (2011.01) |
| G06F 3/14 | (2006.01) |

(52) U.S. Cl.
CPC .......... *G06F 21/35* (2013.01); *G06K 9/6201* (2013.01); *G06Q 30/0222* (2013.01); *G06T 15/005* (2013.01); *G06T 19/006* (2013.01); *H04L 67/12* (2013.01); *H04L 67/18* (2013.01); *H04W 12/63* (2021.01); *H04W 12/68* (2021.01); *G06F 3/14* (2013.01); *G06T 2215/16* (2013.01); *G08C 2201/30* (2013.01); *G08C 2201/92* (2013.01); *H04L 67/025* (2013.01)

(58) Field of Classification Search
CPC ....... H04N 21/42202; H04N 21/42207; H04N 21/42208; H04N 21/42224; H04N 21/42226; H04N 21/41265; H05B 45/10; H05B 47/11; H05B 47/12; H05B 47/105; H05B 47/19; Y02B 20/48; Y02B 20/40; H04W 12/08; H04W 12/50; H04W 12/63; H04W 12/68; H04W 4/80; H04W 84/18; G06Q 30/0643; G06T 15/04; G06T 15/205; G06T 19/006; G06T 2200/24; G06T 2207/30244; G06T 2210/04; G06T 2215/16; G06T 7/246; G06T 7/62; G06T 7/74

See application file for complete search history.

(56) References Cited

U.S. PATENT DOCUMENTS

| | | | |
|---|---|---|---|
| 2015/0188984 A1* | 7/2015 | Mullins | G06T 19/006 709/219 |
| 2015/0317518 A1 | 11/2015 | Fujimaki et al. | |
| 2016/0070900 A1* | 3/2016 | Kim | G06F 21/34 726/3 |
| 2016/0120009 A1 | 4/2016 | Aliakseyeu et al. | |
| 2017/0262247 A1 | 9/2017 | Yoganandan et al. | |
| 2019/0004677 A1 | 1/2019 | Madonna et al. | |
| 2019/0075200 A1* | 3/2019 | Seo | H04N 21/4126 |

* cited by examiner

SYSTEM AND METHOD FOR OPERATING PHYSICAL ENTITIES BASED ON A VIRTUAL REPRESENTATION OF THE PHYSICAL ENTITIES

FIELD

This disclosure relates to the field of electronic control systems and, in particular, to electronic control systems for controlling remotely located electronic devices.

BACKGROUND

Some electronic devices are controllable remotely via specialized control devices and interfaces. For example, some light fixtures may be activated and deactivated via an application (i.e. an "app") run on a smartphone. These applications, however, can be confusing for some users, because it may not be clear to the user which light fixtures are controllable with the application. For example, a user has installed five remotely controllable light fixtures in a room. The light fixtures are identified in the application by non-descriptive names that makes it difficult to select a particular light fixture for control. The user may be dissuaded from using the application to control the light fixtures, because of the difficultly in selecting a particular light fixture for remote control.

Based on the above, improvements to technology are desirable that enable users to easily and efficiently remotely control electronic devices.

SUMMARY

According to an exemplary embodiment of the disclosure, a method of operating a selected electronic device of a plurality of electronic devices includes generating image data of at least the selected electronic device with an imaging device, displaying a virtual representation of at least the selected electronic device on a display device based on the generated image data, and receiving a user input with an input device. The method further includes associating the user input with the selected electronic device using a controller, transmitting device data to the selected electronic device with a transceiver, and performing an operation with the selected electronic device based on the transmitted device data.

According to another exemplary embodiment of the disclosure, an electronic control device is for operating a selected electronic device of a plurality of electronic devices. The electronic control device includes an imaging device, a memory, a display device, an input device, a controller, and a transceiver. The imaging device is configured to generate image data of at least the selected electronic device. The memory is operably connected to the imaging device and is configured to store the image data. The display device is operably connected to the memory and is configured to display a virtual representation of at least the selected electronic device. The input device is configured to receive a user input. The controller is configured to associate the user input with the selected electronic device. The transceiver is operably connected to the selected electronic device and is configured to transmit device data to the selected electronic device. The selected electronic device is configured to perform an operation in response to receiving the transmitted device data.

According to a further exemplary embodiment of the disclosure, an electronic control system includes a plurality of electronic devices each including a first transceiver, and a control device for remotely operating a selected electronic device of the plurality of electronic devices. The control device includes an imaging device, a memory, a display device, an input device, a controller, and a second transceiver. The imaging device is configured to generate image data of at least the selected electronic device. The memory is operably connected to the imaging device and is configured to store the image data. The display device is operably connected to the memory and is configured to display a virtual representation of at least the selected electronic device. The input device is configured to receive a user input. The controller is configured to associate the user input with the selected electronic device. The second transceiver is operably connected to the selected electronic device and is configured to transmit device data to the first transceiver of the selected electronic device. The selected electronic device is configured to perform an operation in response to receiving the transmitted device data.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

Figure 1:
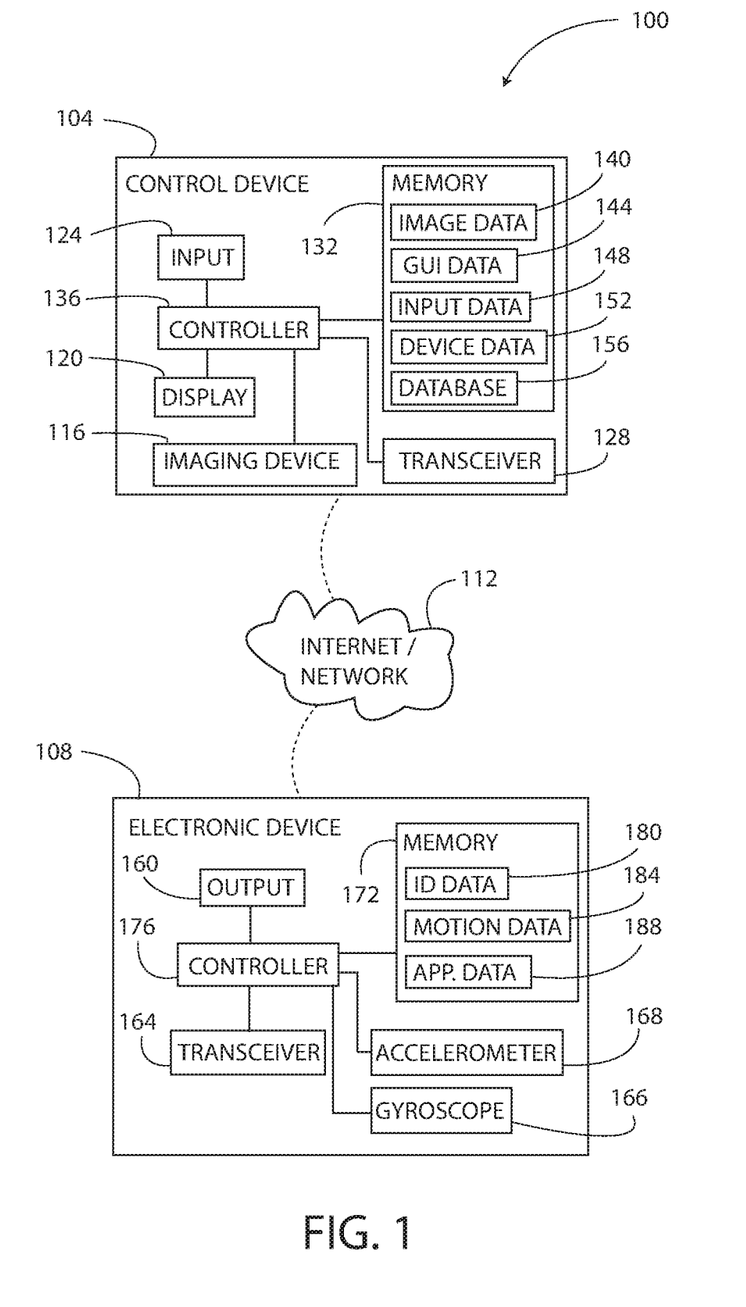
FIG. 1 is a block diagram illustrating an electronic control system including a control device for remotely controlling a plurality of electronic devices.

As shown in FIG. 1, an electronic control system 100 is configured to bridge the gap between the physical world and a virtual representation thereof. The electronic control system 100 includes a control device 104 and at least one electronic device 108 (i.e. a physical entity). The control device 104 and the electronic device 108 are each operably connected to an electronic network, such as the Internet 112. The electronic control system 100 enables a user to actuate or to operate the electronic device 108 by interacting with a virtual depiction of the electronic device 108 on the control device 104. For example, the control device 104 displays an interior image of a smarthome, and clicking on a pixel of a light fixture (i.e. an exemplary electronic device 108) activates or deactivates a lightbulb of the light fixture. Moreover, in a retail environment, when an operator selects a virtual depiction of a customer, the electronic control system 100 transmits discount coupons or other special pricing offers to the selected customer. In this way, the electronic control system 100 links a virtual representation of entities shown by the control device 104 to physical world entities. The electronic control system 100 is also configured to automatically disambiguate targets (i.e. a selected electronic device 108), and to provide a communication medium to send commands to the intended targets. Each element of the electronic control system 100 is described below.

In an exemplary embodiment, the control device 104 is a personal electronic device, such as a smartphone, a tablet computer, or a desktop computer that includes an imaging device 116, a display device 120, an input device 124, a transceiver 128, and a memory 132 each operably connected to a controller 136. The imaging device 116, which is also referred to herein as a camera or a digital camera, is configured to generate image data 140 corresponding to a virtual representation of an area. In particular, the image data 140 includes a virtual representation of the physical elements and structures located in a field of view 142 (FIG. 3) of the imaging device 116. When the electronic device 108 is located within the field of view 142 of the imaging device 116, the imaging device 116 generates image data 140 having data points corresponding to a virtual representation of the electronic device 108. As described below, in another embodiment, the imaging device 116 is a security camera in a retail establishment (see FIG. 4).

As shown in FIG. 1, the display device 120, in one embodiment, is a liquid crystal display (LCD) panel configured to display text, images, and other visually comprehensible data. The display device 120 in another embodiment, is any display as desired by those of ordinary skill in the art, including, but not limited to, an active-matrix organic light-emitting diode display. The display device 120 is configured to display the virtual representation of the area and the electronic device 108, as included in the image data 140. For example, when the electronic device 108 is in the field of the view 142 of the imaging device 116, the display device 120 displays a virtual representation of the electronic device 108 and the area near the electronic device 108. As described below, in another embodiment, the display device 120 is a security monitor in a retail establishment (see FIG. 4).

The display device 120 may also display a graphical user interface (GUI) for operating the control device 104 and/or the electronic device 108. GUI data 144 corresponding to the displayed GUI are saved to the memory 132.

In the exemplary embodiment of FIG. 1, the input device 124 is a touchscreen applied over the display device 120 that is configured to respond to the touch of a finger or a stylus. The input device 124 is touch-sensitive and transparent, and is a capacitive touchscreen, for example. The input device 124 generates input data 148 that is stored in the memory 132. The input device 124 is configured to enable the user to interact with the electronic device 108 by touching the portion of the display device 120 on which the virtual representation of the electronic device 108 is displayed. In yet another embodiment, the input device 124 is any device configured to generate an input signal and the input data 148, as desired by those of ordinary skill in the art. For example, the input device 124 may include a plurality of buttons configured to enable an operator of the control device 104 to generate the input data 148.

The transceiver 128 of the control device 104, which is also referred to as a wireless transmitter and receiver, is configured to wirelessly transmit electronic data (i.e. device data 152) from the control device 104 to the electronic device 108 and to wirelessly receive electronic data from the electronic device 108 via the Internet 112. Thus, the transceiver 128 operably connects the control device 104 to the electronic device 108. In other embodiments, the transceiver 128 sends and receives data using a cellular network, a wireless local area network ("Wi-Fi"), a personal area network, and/or any other wireless network. Accordingly, the transceiver 128 is compatible with any desired wireless communication standard or protocol including, but not limited to, Near Field Communication ("NFC"), IEEE 802.11, IEEE 802.15.1 ("Bluetooth®"), Global System for Mobiles ("GSM"), and Code Division Multiple Access ("CDMA").

The memory 132, in one embodiment, is configured to store the image data 140, the GUI data 144, the input data 148, and the device data 152. The memory 132 is also configured to store a database 156 that is generated based the physical appearance of each electronic device 108 of the plurality of electronic devices. In another embodiment, the database 156 is stored on a remote computer (not shown) that is connected to the control device 104 via the Internet 112. The memory 132 is also referred to herein as a non-transient computer readable medium.

The controller 136 of the control device 104 is configured to execute program instructions in order to operate the imaging device 116, the display device 120, the input device 124, and the memory 132. The controller 136 is provided as at least one microcontroller and/or microprocessor. In one embodiment, controller 136 processes the input data 148, the image data 140, and the database 156 to disambiguate inputs from the user and to identify a user-selected electronic device 108 from the other electronic devices 108.

Figure 3:
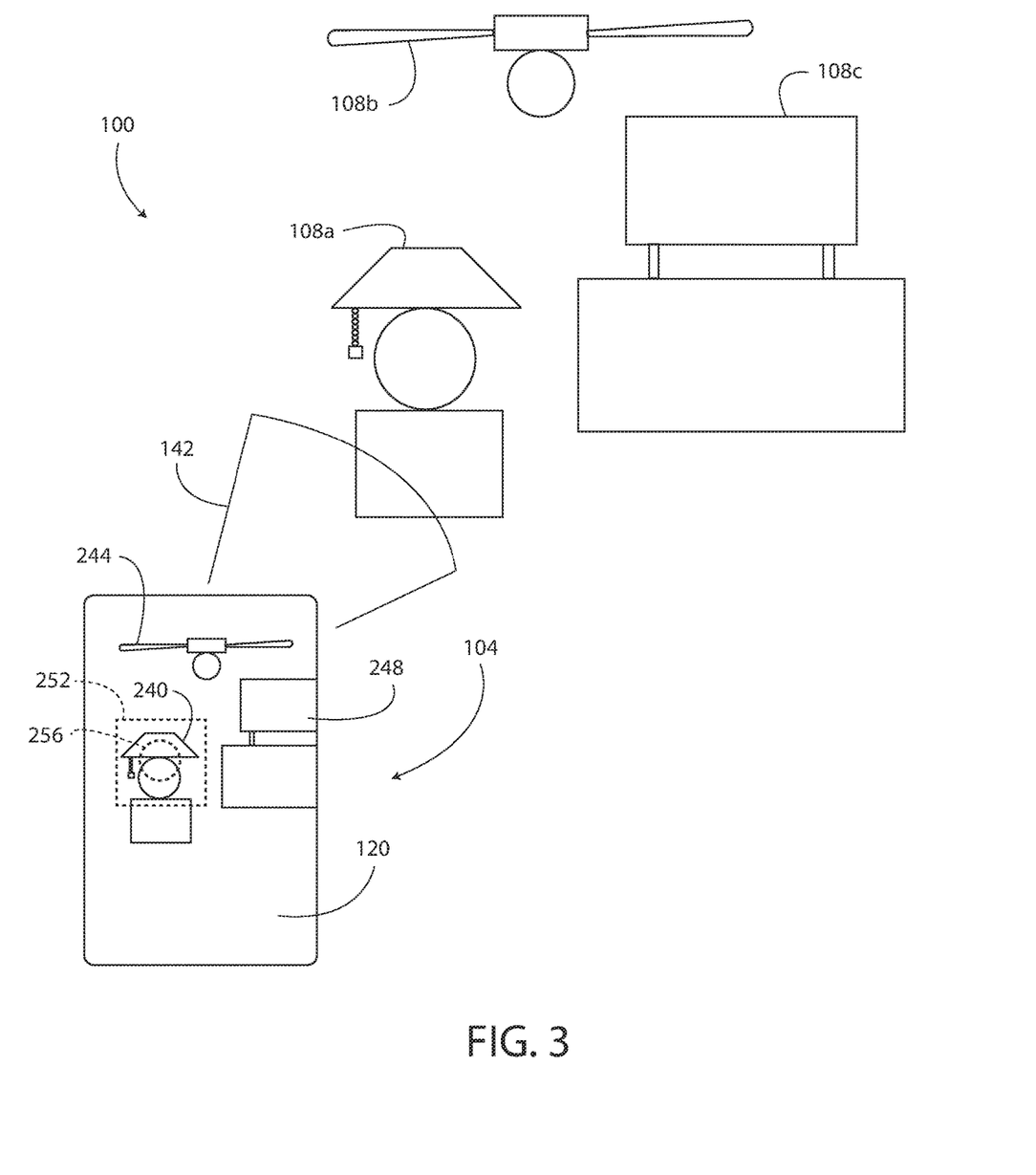
FIG. 3 is a block diagram illustrating an exemplary usage of the electronic control system of FIG. 1.

With reference again to FIG. 1, the exemplary electronic device 108 includes an output 160, a transceiver 164, an accelerometer 168, a gyroscope 166, and a memory 172 each operably connected to a controller 176. The electronic device 108 is representative of any device that is remotely controllable by way of the control device 104. Examples of the electronic device 108 include, but are not limited to, any combination of light fixtures, lightbulbs, smartphones, ceiling fans, televisions, desktop computers, tablet computers, digital signage, highway billboards, music players, and the like. The output 160 of the electronic device 108, therefore, depends on the particular embodiment. In the exemplary embodiment described herein, the output 160 is a lighting element of a light fixture 108a (FIG. 3), the motor of a ceiling fan 108*b* (FIG. 3), and the display of a smartphone or a television 108*c* (FIG. 3). The output 160 can be configured in at least two states including an "off state" and an "on state." In the light fixture 108*a* embodiment, the output 160 does not emit light in the "off state," and the output 160 emits light in the "on state." In the ceiling fan 108*b* embodiment, the output 160 does not rotate fan blades in the "off state," and the output 160 rotates the fan blades in the "on state." In the smartphone and the television 108*c* embodiment, the output 160 does not display a picture in the "off state," and the output 160 displays a picture in the "on state." Based on the above, the electronic device 108 is a smartphone, in one embodiment, or is incorporated into a smartphone in another embodiment. The smartphone, in each embodiment, may be carried by an individual.

The transceiver 164 of the electronic device 108, which is also referred to as a wireless transmitter and receiver, is configured to wirelessly transmit electronic data from the electronic device 108 to the control device 104 and to wirelessly receive electronic data from the control device 104 via the Internet 112. Thus, the transceiver 164 operably connects the electronic device 108 to the control device 104. In other embodiments, the transceiver 164 sends and receives data using a cellular network, a wireless local area network ("Wi-Fi"), a personal area network, and/or any other wireless network. Accordingly, the transceiver 164 is compatible with any desired wireless communication standard or protocol including, but not limited to, Near Field Communication ("NFC"), IEEE 802.11, IEEE 802.15.1 ("Bluetooth®"), Global System for Mobiles ("GSM"), and Code Division Multiple Access ("CDMA").

In one embodiment, the transceiver 164 receives the device data 152 from the control device 104. The device data 152 is configured to change the state of the output 160 of the electronic device 108. For example, if the electronic device 108 is a light fixture, the device data 152 may cause the electronic device 108 to change the lighting element from the "off state" to the "on state." Similarly, other device data 152 may cause the electronic device 108 to change the lighting element from the "on state" to the "off state."

The transceiver 164 is also configured to transmit identification data 180 that is stored in the memory 172 to the control device 104 upon receiving a corresponding electronic request from the control device 104. The identification data 180 uniquely identifies the electronic device 108 to the control device 104, so that the each electric device 108 of a plurality of electronic devices is individually selectable and identifiable by the control device 104.

The gyroscope 166 and the accelerometer 168 are sensors configured to generate motion data 184 while the electronic device 108 is being carried, worn, and/or utilized by a user, such as embodiments in which the electronic device 108 is smartphone or a tablet computer, for example. When the user is moving, the motion data 184 may correspond to a step rate of the user, a speed of the user, and/or an acceleration of the user. Thus, the motion data 184 is usable by the control device 104 to enable the control device 104 to automatically identify the electronic device 108 from a plurality of other electronic devices by matching a movement of the electronic device 108 according to the image data 140 to the movement of the electronic device 108 according to the motion data 184. The gyroscope 166 is provided as any type of gyroscope, such as a single-axis or a multi-axis microelectromechanical (MEMS) gyroscope. The accelerometer 168 is provided as any type of accelerometer, such as a single-axis or a multi-axis MEMS accelerometer.

The memory 172 is configured to store the identification data 180, the motion data 184, and application data 188. The memory 172 is also referred to herein as a non-transient computer readable medium.

The application data 188 is included in some embodiments of the electronic device 108, such as when the electronic device 108 is a smartphone or a tablet computer. The application data 188 enables the electronic device 108 to run an "app" that configures the electronic device 108 for electronic data transfer with the control device 104. The application data 188 may result in a GUI displayed on the output 160. The app may also regulate generation of the motion data 184 with the gyroscope 166 and the accelerometer 168.

Figure 2:
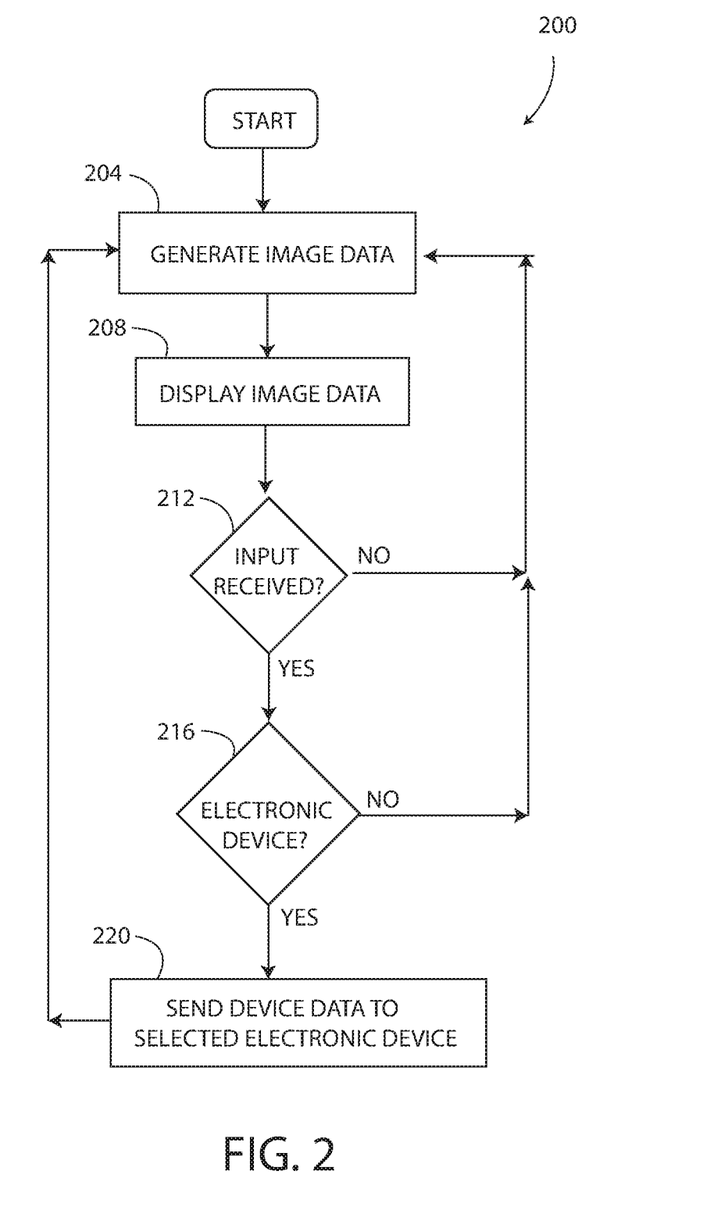
FIG. 2 is a flowchart illustrating an exemplary method of operating the electronic control system of FIG. 1.

In operation, the electronic control system 100 is configured to implement a method 200 for controlling the electronic device 108 with the control device 104 that is illustrated by the flowchart of FIG. 2. The method 200 is described in connection with an exemplary smarthome embodiment of the electronic control system 100 that is illustrated in FIG. 3.

As shown in FIG. 3, the electronic control system 100 is located in an exemplary smarthome and includes the control device 104 configured as a smartphone and three electronic devices 108 (i.e. a plurality of electronic devices) including the light fixture electronic device 108*a*, the ceiling fan electronic device 108*b*, and the television electronic device 108*c*. In the smarthome, the control device 104 operates as a "remote control" for the electronic devices 108*a*, 108*b*, 108*c* that is configured to activate and to deactivate each of the outputs 160 of the electronic devices 108*a*, 108*b*, 108*c*.

According to the method 200, the user desires to remotely control a selected one of the electronic devices 108*a*, 108*b*, 108*c*. In this example, the selected electronic device is the light fixture electronic device 108*a*. In block 204, the method 200 includes generating the image data 140 of at least the selected electronic device 108*a* with the imaging device 116 of the control device 104. To generate the image data 140, the user points the imaging device 116 at the selected electronic device 108*a* so that the selected electronic device 108*a* is in the field of view 142 of the imaging device 116, in same manner that a user would use a smartphone to take a picture or a video of the selected electronic device 108*a*. The imaging device 116 generates the image data 140 and at least a portion of the image data 140 is stored in the memory 132.

Next, in block 208 and as shown in FIG. 3, the controller 136 of the control device 104 processes the image data 140, and a virtual representation of the selected electronic device 108*a* and the area around the selected electronic device 108*a* are shown on the display device 120. As shown, in this example, the virtual representation includes a virtual representation of the light fixture 240, a virtual representation of the ceiling fan 244, and a virtual representation of the television 248. The image on the display device 120 changes when the user moves the imaging device 116 of the control device 104, and the display device 120 is continuously updated so that the image on the display device 120 corresponds to the area in the field of the view 142 of the imaging device 116.

In block 212, the control device 104 determines if an input has been received by the input device 124. If no input has been received, then the control device 104 continues to generate the image data 140 and to display the virtual representations 240, 244, 248. If, however, at block 212, the control device 104 determines that an input has been received with the input device 124, the control device 104 stores corresponding input data 140 in the memory 132, and the method 200 continues to block 216. In one embodiment, the user provides an input to the control device 136 by touching the display device 120 (i.e. the touch-sensitive input device 124 overlaid upon the display device 120) at a location corresponding to the virtual representation 240 of the selected electronic device 108*a*. For example, in FIG. 3, the user touches the input device 124 at the input location 252, which corresponds to the virtual representation of the light fixture 240, and corresponding input data 148 is generated.

At block 216 of the method 200, the control device 104 determines if the input data 140 corresponds to one of the electronic devices 108, and the controller 136 associates the input data 140 with the selected electronic device 108*a*. In one example, the control device 104 compares the image data 140 in a local region 256 surrounding the input location 252 to the database 156 to determine if the input data 140 corresponds to one of the virtual representations 240, 244, 248 of the electronic devices 108*a*. 108*b*, 108*c*. The database 156 is built with image data of the electronic devices 108 including multiple angles and multiple types of lighting. In a specific embodiment, the database 156 is a neural network trained with image data of the electronic devices 108. The image data 140 from the local region 252 is input to the database 156 (i.e. the neural network), and the neural network generates a corresponding output that identifies local region 252 as either including a virtual representation 240, 244, 248 of one of the electronic devices 108*a*, 108*b*, 108*c* or not including a virtual representation 240, 244, 248 of one of the electronic devices 108*a*, 108*b*, 108*c*.

When, at block 216, the comparison of the image data 140 at the local region 256 and the database 156 indicates that the input location 252 does not correspond to a virtual representation 240, 244, 248 of one of the electronic devices 108*a*, 108*b*, 108*c*, the method 200 returns to block 204 and the imaging device 116 continues to generate the image data 140. This is because the input data 148 was not associated with a state change of the output 160 of one of the electronic devices 108*a*, 108*b*, 108*c*. The control device 104, therefore, takes no action in attempting to control one of the electronic devices 108*a*, 108*b*, 108*c* based on the input data 148.

When, at block 216, the comparison of the image data 140 at the local region 256 and the database 156 indicates that the input location 252 does correspond to a virtual representation 240, 244, 248 of one of the electronic devices 108*a*, 108*b*, 108*c*, the controller 136 identifies the selected electronic device 108*a*. Thus, at block 216, the control device 104 has made a connection between the virtual representation 240 of the light fixture 108*a* the physical light fixture 108*a*. The method 200 continues to block 220.

At block 220 of the method 200, the control device 104 transmits the device data 152 to the selected electronic device 108*a*, as identified by user at the input location 252. Specifically, the control device 104 establishes an electronic communication link with the selected electronic device 108*a* via the network 112 (i.e. the Internet 112, a local area network connection, a Bluetooth connection, and/or a Wi-Fi connection) and uses the transceiver 128 to transmit the device data 152 to the selected electronic device 108*a* over the electronic communication link. The selected electronic device 108*a* receives the device data 152 with the transceiver 164, and the controller 176 processes the device data 152 to determine an operation to be performed by the output 160. In the exemplary embodiment, the operation performed by the output 160 includes changing the state of the light fixture from the "on state" to the "off state," or from the "off state" to the "on state."

Depending on the embodiment, the operation performed by the electronic device 108 based on the transmitted device data 152 depends on the particular input data 148 received by the control device 104. For example, if the user touches the input location 252 with a single "tap" of the finger, then the device data 152 is a "power on" signal that causes the operation performed by the electronic device 108 to energize the output 160, such as by turning on the light fixture 108*a*, turning on the ceiling fan 108*b*, and turning on the television 108*c*. Whereas, if the user touches the input location 252 with a double "tap" of the finger, then the input data 148 is a "power off" signal that causes the operation performed by the electronic device 108 to de-energize the output 160, such as by turning off the light fixture 108*a*, turning off the ceiling fan 108*b*, and turning off the television 108*c*. Any other input configuration may also be implemented by the control device 104 to enable remote control of any aspect of the electronic devices 108, such as brightness/dim control for the light fixture 108*a*; fan speed control for the ceiling fan 108*b*; and volume, channel, and input control for the television 108*c*.

The electronic control system 100 provides advantages over existing technology. For example, some light fixtures are remotely controllable with a dedicated device or by way of an app that includes only icons of the light fixture; however, known light fixtures are not remotely controllable via an app that displays an actual image (i.e. a virtual representation 240) of the light fixture to be controlled. Thus, the electronic control system 100 simplifies remote control of an electronic device 108 by preventing the user from having to remember any details of the electric device 108, such as an identifying name of the electronic device 108. Instead, the user simply points the control device 104 at the selected electronic device 108 and touches the corresponding area of the input device 124/display device 120 to control selected electronic device 108. In a smarthome with many electronic devices 108, the electronic control system 100 makes control of the electronic devices 108 very simple and convenient for the user.

In one embodiment, a setup procedure is performed by the electronic control system 100 when an electronic device 108 is added to the smarthome. For example, during the installation of a light fixture, such as the light fixture 108*a*, the installer provides a mapping from image data corresponding to the light fixture 108*a* to an electronic identification of the light fixture 108*a*, such as an IP address of the light fixture. Any other setup and mapping approach may be taken by the electronic control system 100 in response to additional electronic devices 108 being added to the system 100.

For example, the control device 104, in some embodiments, is configured to perform a trial and error approach to determine the mapping and the identification of an electronic device 108. For example, when a user selects a blue lamp as the selected electronic device 108, there may be two blue lamps located in the smarthome. The controller 136 identifies a first one of the blue lamps and sends device data 152 to the first blue lamp to illuminate the lamp. If the unselected lamp (i.e. the second blue lamp that does not correspond to the input data 148) is illuminated, then the controller 136 detects as much by processing the image data 140, which shows that the first blue lamp corresponding to the input data 148 has not changed states. Accordingly, the control device 104 sends further device data 152 to the selected lamp, which corresponds to the input data 148, to cause the selected lamp to change states. The change in state of the selected lamp (i.e. the selected electronic device 108) is identified, in some embodiments, by the controller 136 as a change in appearance of the selected lamp, as virtually represented by the image data 140.

Moreover, when the electronic control system 100 performs visual recognition of objects, it captures various visual properties of the object. For example, when controller 136 detects that the image data corresponds to a lamp (an exemplary electronic device 108), the controller 136 stores properties of the detected lamp in a data file that includes the color of the lamp, the size of the lamp, and the location of the lamp relative to other detected electronic device 108 in the smarthome. According to this approach, when input data 148 is generated by a user, the controller 136 performs object detection in the local region 252 of the image data 140 to determine the category of objects in the local region 252. That is, the controller 136 determines if there a refrigerator or a lamp in the local region 252. Then, after detecting the object category, for example light fixtures, the controller 136 extracts more information about the properties of the detected object, such as the color, size, placement, and location of the object in the image data 140. The controller 136 uses this information to disambiguate the lamp from other light fixtures and other electronic devices 108 in the smarthome.

Figure 4:
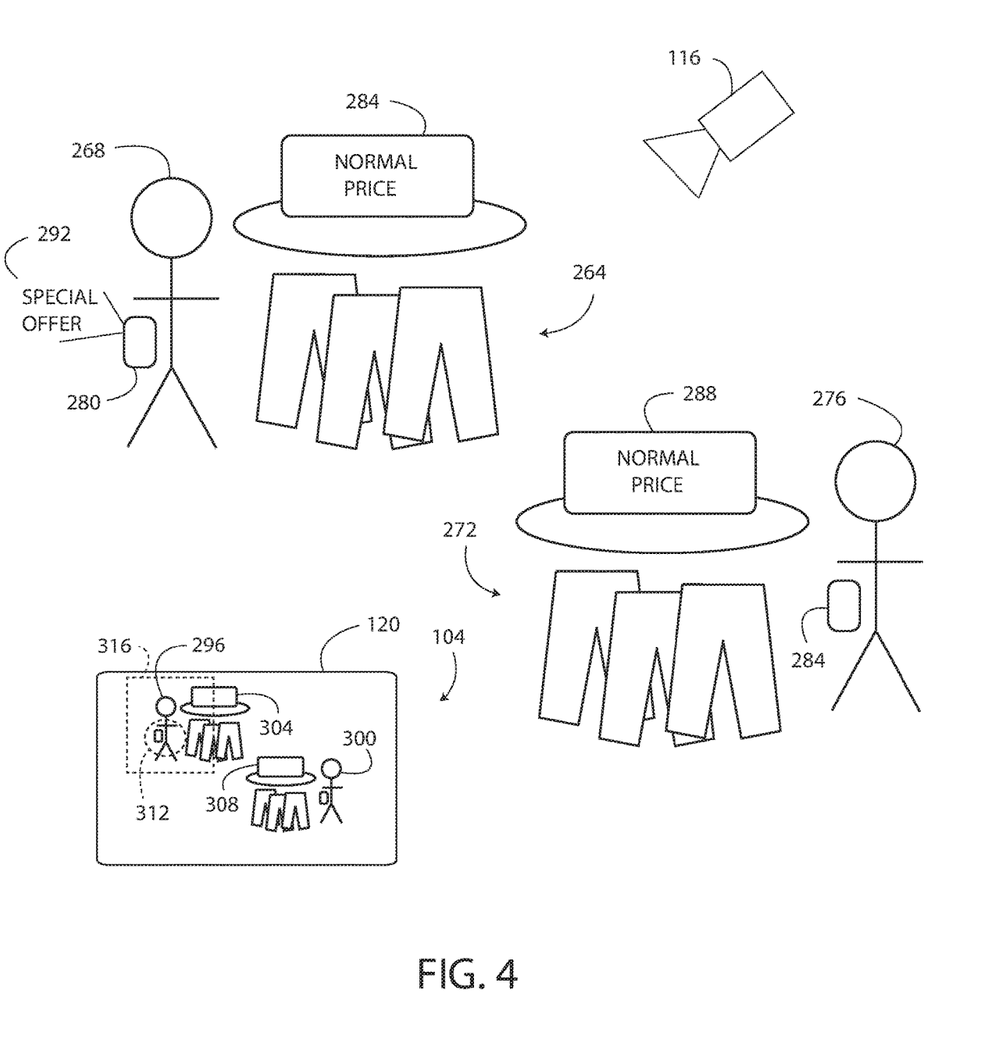
FIG. 4 is a block diagram illustrating another exemplary usage of the electronic control system of FIG. 1.

FIG. 4 illustrates another exemplary usage of the electronic control system 100 in a retail establishment. The retail establishment includes a first rack 264 of clothing that is being viewed by a first customer 268 and a second rack 272 of clothing that is being viewed by a second customer 276. The first customer 268 has a first smartphone 280, and the second customer 276 has a second smartphone 284. The control device 104, in this exemplary embodiment, is a two-part system that includes an imaging device 116 shown as a security camera, and a display device 120 provided as a monitor. The plurality of electronic devices 108 in this embodiment includes a first tablet computer 284, a second tablet computer 288, and the first smartphone 280. As explained below, the second smartphone 284 is not one of the electronic devices 108.

The first smartphone 280 is included as one of the electronic devices 108 because the first smartphone includes an app (i.e. app data 188) that configures the smartphone 280 to operably connect to the electronic control system 100. Thus, the control device 104 is configured to send the device data 152 to the first smartphone 280 to cause the first smartphone 280 to perform an operation, such as displaying a notification 292 including data regarding pricing offers. The second smartphone 284 is not included as one of the electronic devices 108 because the second smartphone 284 does not include the app (i.e. app data 188) and is not operably connected to the electronic control system 100. Thus, the control device 104 is not configured to send the device data 152 to the second smartphone 284.

The electronic control system 100 of FIG. 4 is improvement over existing retail establishment security monitoring systems. In particular, in addition to providing the typical benefits associated with a security monitoring system, such as real-time video monitoring, the electronic control system 100 enables an operator of the control device 104 to provide specialized promotions, suggestions, and other information to a selected customer of a plurality of customers.

For example, an operator viewing a virtual representation of the retail establishment on the display screen 120, is shown a virtual representation of the first customer 296 and a virtual representation of the second customer 300 (i.e. blocks 204 and 208 of the flowchart of FIG. 2). Moreover, the display device 120 displays a virtual representation of at least some of the electronic devices 304, 308. The smartphone 280, which is an electronic device 108, may or may not be displayed because the smartphone 280 may be located in pocket or a purse of the customer 268.

By viewing the display device 120, the operator of the control device 104 determines that the first customer 268 is browsing the clothing selection of the first clothing rack 264, but has not selected an article for purchase. The first customer 268 may have viewed the tablet computer 284 that displays the normal price of the articles, for example, and was unpersuaded to make a selection. To entice the first customer 268 to make a selection, and ultimately a purchase, the operator uses the input device 124 to touch the area of the display device 120 corresponding to the virtual representation of the first customer 296 at the input location 312 (i.e. block 212 of FIG. 2).

Next, the control device 104 determines the most efficient means of presenting the first customer 268 a special pricing offer, for example. In one embodiment, the controller 136 processes the image data 140 to determine which of the electronic devices 280, 284, 288 are within a local region 316 near the input location 312. As shown in FIG. 4, the smartphone 280 and the tablet computer 284 are within the local region 316. The process for making this determination is described below.

The control device 104 determines that the tablet computer 284 is in the local region 316 by processing the image data 140 corresponding to the virtual representation of the tablet computer 304 and the database 156. Since, the database 156 is built with images and the location of the tablet computer 284, the control device 104 is able to identify the tablet computer 284 from the image data 140.

The control device 104 determines that the first smartphone 280, which includes the app data 188, is in the local region 316 based on the motion data 184 and the image data 140. The control device 104 receives the motion data 184 generated by the gyroscope 166 and the accelerometer 168 from the first smartphone 280 via the Internet/local network 112. The control device 104 is able to electronically communicate with the first smartphone 280 and to receive the motion data 184, because the smartphone 280 includes the app data 188, which establishes the permissions used to extract the motion data 184 from the smartphone 280. The app data 188 enables the first smartphone 280 to send electronic data to the control device 104 and to receive electronic data from the control device 104. The motion data 184 is processed to determine a fine-grained motion signature of the customer 268/smartphone 280 based on at least one of a speed of movement of the customer 268, an acceleration of the customer 268, a movement time of the customer 268, and a stationary time of the customer 268. Then, the controller 136 compares the motion data 184 to the image data 140 to identify one of the virtual representations of the customers 296, 300 that has movements corresponding to the motion data 184.

In addition to forming the fine-grained motion signature of the customer 268 based on the motion data 184, the control device 104 may also use additional data to identify the selected customer 268 from the virtual representation 296, 300 thereof. For example, Wi-Fi traffic data, Bluetooth packets, gyroscope data, magnetometer data, and/or light sensor data may be used to build the fine-grained motion signature of a smartphone 280 moving though the image data 140. Using this data, customers 268, 276 are separated, matched, and identified by performing multimodal sensor fusion by correlating the motion signature across different sensing modalities. When a customer 268, 276 walks through a store, subtle movements due to his/her gait (micro-movement) and long-term trajectory of walking (macro-movement) are shown in the image data 140 as well as through sensor of the smartphone 280 (i.e. the accelerometer 168). Also, the Wi-Fi traffic generated by the smartphone 280 is leveraged to estimate Angle of Arrival (AoA) and range from the imaging device 116 to capture the micro-movements and the macro-movements of the customer 268, 276. The control device 104 fuses this data together and captures the same motion signature from different perspectives, thereby enabling the control device 104 to detect, localize, and identify the customers 268, 276 shown as the virtual representations of the customers 296, 300 on the display device 120.

When a match between the motion data 184 and the virtual representations of the customer 296 occurs, the control device 104 sends the device data 152 to the corresponding smartphone 280, which is the first smartphone 280 in this example. The device data 152 causes the first smartphone 280 to perform an operation, such as displaying a special discounted pricing offer 292 that is a lower price than the normal price displayed on the tablet computer 284. Thus, in this way, the electronic control system 100 has provided a personalized discount to the customer 268 that may cause the customer 268 to purchase an article of the clothing.

When a match between the motion data 184 and the virtual representation of the customer 296 does not occur, then the control device 104 send the device data 152 to the nearest electric device 108, such as the first tablet computer 284. The tablet computer 284 receives the device data 152 and performs an operation such as displaying discounted pricing offers instead of displaying the normal price of the articles. Thus, even if the customer 268, 276 does not have a smartphone running the app data 188, the electronic control system 100 is configured to deliver a personalized discount to the selected customer 268 that may cause the customer 268 to purchase an article of the clothing.

The electronic control system 100 in this embodiment improves a typical security camera system, by enabling an operator thereof to reach out to selected customers 268, 276 with special offers, suggestions, promotions, discounts, recommendations, and information.

In addition, the electronic control system 100 can be applied to other areas to improve the operation of imaging systems. For example, the techniques and methods described herein can be generalized to airports, hospitals, stadiums, theaters, academic buildings, and convention centers. The electronic control system 100 is usable anywhere a link from pixels of an image to physical entities is beneficial.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. An electronic control device for operating a selected electronic device of a plurality of electronic devices, the electronic control device comprising:
   an imaging device configured to generate image data of an area including at least a first electronic device of the plurality of electronic devices;
   a memory operably connected to the imaging device and configured to store the image data;
   a display device operably connected to the memory and configured to display a virtual representation of the area;
   an input device configured to receive a user input corresponding to a local region of the virtual representation of the area;
   a transceiver operably connected to the selected electronic device and configured (i) to receive motion data transmitted from the first electronic device and corresponding to movement of the first electronic device in the area, and (ii) to transmit device data to the selected electronic device; and
   a controller configured to identify the first electronic device as the selected electronic device based on a comparison of the motion data with the image data of the local region,
   wherein the selected electronic device is configured to display the transmitted device data on a display device of the selected electronic device.

2. The electronic control device of claim 1, further comprising:
   a database stored in the memory, the database based on an appearance of the plurality of electronic devices, wherein the imaging device is configured to generate image data of the selected electronic device, and
   wherein the controller is configured to identify the first electronic device as the selected electronic device by comparing the image data of the selected electronic device to the appearance of the selected electronic device in the database.

3. The electronic control device of claim 1, wherein:
   the controller is configured to establish an electronic communication link with the selected electronic device; and
   the transceiver is configured to transmit the device data to the selected electronic device over the electronic communication link.

4. The electronic control device of claim 1, wherein: the device data includes pricing offers.

5. The electronic control device of claim 1, wherein:
   the selected electronic device is a smartphone,
   displaying the transmitted device data includes displaying a notification on the smartphone, and
   the notification includes data regarding pricing offers.

6. The electronic control device of claim 1, wherein the motion data is generated with at least one of an accelerometer and a gyroscope of the first electronic device.

7. A method of operating a selected electronic device of a plurality of electronic devices, comprising:
   generating image data of an area including at least a first electronic device of the plurality of electronic devices with an imaging device;
   displaying a virtual representation of the area on a display device based on the generated image data;
   receiving a user input with an input device corresponding to a local region of the virtual representation of the area;
   receiving motion data transmitted from the first electronic device corresponding to movement of the first electronic device in the area;
   identifying the first electronic device as the selected electronic device based on a comparison of the motion data with the image data of the local region;
   transmitting device data to the selected electronic device with a transceiver; and
   displaying the transmitted device data on a display of the selected electronic device.

8. The method of claim 1, further comprising:
building a database based on an appearance of the plurality of electronic devices;
generating image data of the selected electronic device with the imaging device; and
identifying the first electronic device as the selected electronic device by comparing the image data of the selected electronic device to the appearance of the selected electronic device in the database.

9. The method of claim 1, further comprising:
establishing an electronic communication link with the selected electronic device; and
transmitting the device data to the selected electronic device using the transceiver over the electronic communication link.

10. The method of claim 7, wherein:
the device data includes pricing offers.

11. The method of claim 7, wherein:
the selected electronic device is a smartphone,
displaying the transmitted device data includes displaying a notification on the smartphone, and
the notification includes data regarding pricing offers.

12. The method of claim 7, further comprising:
generating the motion data with at least one of an accelerometer and a gyroscope of the first electronic device.

13. An electronic control system comprising:
a plurality of electronic devices each including a first transceiver;
a control device for remotely operating a selected electronic device of the plurality of electronic devices, the control device comprising
 an imaging device configured to generate image data of at least the selected electronic device,
 a memory operably connected to the imaging device and configured to store the image data,
 a display device operably connected to the memory and configured to display a virtual representation of at least the selected electronic device,
 an input device configured to receive a user input,
 a controller configured to associate the user input with the selected electronic device, and
 a second transceiver operably connected to the selected electronic device and configured to transmit device data to the first transceiver of the selected electronic device,
wherein the selected electronic device is configured to perform an operation in response to receiving the transmitted device data,
wherein the selected electronic device includes another display device,
wherein the operation includes displaying the device data on the other display device, and
wherein the device data includes pricing offers.

14. The electronic control system of claim 13, further comprising:
a database stored in the memory, the database based on an appearance of the plurality of electronic devices,
wherein the controller is configured to associated the user input with the selected electronic device by comparing the image data of the selected electronic device to the appearance of the selected electronic device in the database.

15. The electronic control system of claim 13, further comprising:
the first transceiver is configured to establish an electronic communication link with the second transceiver of the selected electronic device; and
the first transceiver is configured to transmit the device data to the second transceiver over the electronic communication link.

16. The electronic control system of claim 13, wherein:
the selected electronic device is a smartphone including the other display device,
the operation includes displaying a notification on the smartphone, and
the notification includes the data regarding pricing offers.

* * * * *

UNITED STATES PATENT AND TRADEMARK OFFICE
CERTIFICATE OF CORRECTION

PATENT NO. : 11,120,682 B2  
APPLICATION NO. : 16/280583  
DATED : September 14, 2021  
INVENTOR(S) : Munir et al.

Page 1 of 1

It is certified that error appears in the above-identified patent and that said Letters Patent is hereby corrected as shown below:

In the Claims

In Claim 8, at Column 13, Line 1: "The method of claim 1" should read --The method of claim 7--.

In Claim 9, at Column 13, Line 10: "The method of claim 1" should read --The method of claim 7--.

In Claim 16, at Column 14, Line 38: "the data regarding pricing offers." should read --the pricing offers.--.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*